US010824941B2

(12) United States Patent
Volkovs et al.

(10) Patent No.: US 10,824,941 B2
(45) Date of Patent: Nov. 3, 2020

(54) END-TO-END DEEP COLLABORATIVE FILTERING

(71) Applicant: THE TORONTO-DOMINION BANK, Toronto (CA)

(72) Inventors: Maksims Volkovs, Toronto (CA); Tomi Johan Poutanen, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 508 days.

(21) Appl. No.: 15/389,315

(22) Filed: Dec. 22, 2016

(65) Prior Publication Data
US 2017/0185894 A1    Jun. 29, 2017

Related U.S. Application Data

(60) Provisional application No. 62/387,493, filed on Dec. 23, 2015.

(51) Int. Cl.
| | | |
|---|---|---|
| *G06N 3/08* | (2006.01) | |
| *G06N 3/04* | (2006.01) | |
| *G06N 5/02* | (2006.01) | |

(52) U.S. Cl.
CPC .............. *G06N 3/08* (2013.01); *G06N 3/0427* (2013.01); *G06N 3/0454* (2013.01); *G06N 5/022* (2013.01)

(58) Field of Classification Search
CPC ...... G06N 3/08; G06N 3/0427; G06N 3/0454; G06N 5/022
See application file for complete search history.

(56) References Cited

U.S. PATENT DOCUMENTS

| | | | | | |
|---|---|---|---|---|---|
| 6,041,311 | A | * | 3/2000 | Chislenko | .............. G06Q 30/02 |
| | | | | | 705/26.7 |
| 7,613,663 | B1 | * | 11/2009 | Commons | ................ G06N 3/08 |
| | | | | | 706/15 |

(Continued)

FOREIGN PATENT DOCUMENTS

WO    WO 2013/043672 A1    3/2013

OTHER PUBLICATIONS

Jianlin Cheng, Zheng Wang, and Gianluca Pollastri. "A Neural Network Approach to Ordinal Regression" 2008 [Online] DOwnloaded Apr. 10, 2019 https://ieeexplore.ieee.org/stamp/stamp.jsp?tp=&arnumber=4633963 (Year: 2008).*

(Continued)

*Primary Examiner* — Ben M Rifkin
(74) *Attorney, Agent, or Firm* — Fenwick & West LLP

(57) ABSTRACT

A recommendation system generates recommendations for an online system using one or more neural network models that predict preferences of users for items in the online system. The neural network models generate a latent representation of a user and of a user that can be combined to determine the expected preference of the user to the item. By using neural network models, the recommendation system can generate predictions in real-time for new users and items without the need to re-calibrate the models. Moreover, the recommendation system can easily incorporate other forms of information other than preference information to generate improved preference predictions by including the additional information to generate the latent description of the user or item.

40 Claims, 13 Drawing Sheets

(56) References Cited

U.S. PATENT DOCUMENTS

| | | | | |
|---|---|---|---|---|
| 7,689,682 | B1* | 3/2010 | Eldering | G06Q 40/00 709/223 |
| 2002/0077931 | A1* | 6/2002 | Henrion | G06Q 30/02 707/713 |
| 2013/0290905 | A1* | 10/2013 | LuVogt | G06N 3/006 715/835 |

OTHER PUBLICATIONS

Tarik Rashid. "A heterogeneous Ensemble Network Using Machine Learning Techniques" 2009 [Online] Downloaded Apr. 10, 2019 http://citeseerx.ist.psu.edu/viewdoc/download?doi=10.1.1.535.1084&rep=rep1&type=pdf (Year: 2009).*

Quinstreet "C++ Tutorial: A Beginner's guide to Std::vector, Part 1" Verified by wayback machine to 2012 [Online] Downloaded Aug. 5, 2019 https://web.archive.org/web/20120328173810/https://www.codeguru.com/cpp/cpp/cpp_mfc/stl/article.php/c4027/C-Tutorial-A-Beginners-Guide-to-stdvector-Part-1.htm (Year: 2012).*

Jennings, Andrew and Hideyki Higuchi "A personal news service based on a user model neural network" 1992 [Online] Downloaded Aug. 5, 2019 http://citeseerx.ist.psu.edu/viewdoc/download;jsessionid=A379C601F9782CDD3130644FEDEA1371?doi=10.1.1.52.1177&rep=rep1&type=pdf (Year: 1992).*

Yuan, Soe-Tsyr and Y.W. Taso. "A recommendation mechanism for contextualized mobile advertising" 2003 [Online] Downlaoded Jun. 26, 2020 https://www.sciencedirect.com/science/article/pii/S0957417402001896 (Year: 2003).*

Canadian Office Action, Canadian Application No. 3,007,853, dated Jun. 26, 2018, 4 pages.

Dieleman, S., "Recommending Music on Spotify with Deep Learning," Aug. 5, 2014, 18 pages, May be Retrieved at<URL:http://benanne.github.io/2014/08/05/spotify-cnns.hmtl>.

PCT International Search Report and Written Opinion, PCT Application No. PCT/CA2016/051535, dated Mar. 8, 2017, 10 pages.

Schelter, S. et al., "Latent Factor Models for Collaborative Filtering," AIM3—Scalable Data Analysis and Data Mining, Jul. 5, 2012, 16 pages, May be Retrieved at<URL:https://www.slideshare.net/sscdotopen/latent-factor-models-for-collaborative-filtering>.

Van Den Oord, A. et al., "Deep Content-Based Music Recommendation," Proceeding NIPS'13, Proceedings of the 26th International Conference on Neural Information Processing Systems, Dec. 10, 2013, pp. 2643-2651.

Agarwal, D. et al., "Regression-Based Latent Factor Models," KDD'09, Jun. 28-Jul. 1, 2009, pp. 19-27.

Balakrishnan, S. et al., "Collaborative Ranking," WSDM, 2012, 10 pages.

Chen, X. et al., "RegionKNN: A Scalable Hybrid Collaborative Filtering Algorithm for Personalized Web Service Recommendation," 2010 IEEE International Conference on Web Services, ICWS, 2010, pp. 9-16.

Chopra, S. et al., "Learning a Similarity Metric Discriminatively, with Application to Face Verification," CVPR, 2005, 8 pages.

Gantner, Z. et al., "MyMediaLite: A Free recommender System Library," RecSys 2011, ACM Recommender Systems, 2011, 4 pages.

Hu, Y. et al., "Collaborative Filtering for Implicit Feedback Datasets," International Conference on Data Engineering, 2008, 10 pages.

Jarvelin, K. et al., "IR Evaluation Methods for Retrieving Highly Relevant Documents," ACM Special Interest Group on Information Retrieval, Proceedings of the 23rd Annual International ACM SIGIR Conference on Research and Development in Information Retrieval, ACM, 2000, pp. 41-48.

Kim, Y., "Convolutional Neural Networks for Sentence Classification," arXiv preprint arXiv: I 408.5882, Sep. 3, 2014, 6 pages.

Koren, Y., "Factorization Meets the Neighborhood: a Multifaceted Collaborative Filtering Model," KDD'08, ACM, Aug. 24-27, 2008, pp. 426-434.

Krizhevsky, A. et al., "ImageNet Classification with Deep Convolutional Neural Networks," NIPS, 2012, pp. 1-9.

Rendle, S. et al., "BPR: Bayesian Personalized Ranking from Implicit Feedback," Conference on Uncertainty in Artificial Intelligence, 2009, 10 pages.

Sainath, T. et al., "Deep Convolutional Neural Networks for LVCSR," ICASSP, 2013, 5 pages.

Salakhutdinov, R. et al., "Probabilistic Matrix Factorization," Neural Information Processing Systems, 2008, pp. 1-8.

Srivastava, N., et al., "Dropout: A Simple Way to Prevent Neural Networks from Overfitting," JMLR, Journal of Machine Learning Research, 2014, pp. 1929-1958, vol. 15, No. 1.

Su, X. et al., "A Survey of Collaborative Filtering Techniques," Advances in Artificial Intelligence, 2009, 19 pages, vol. 2009, Article ID 421425.

Su, X. et al., "Hybrid Collaborative Filtering Algorithms Using a Mixture of Experts," In WJ-IAT, 2007, 5 pages.

Szegedy, C. et al., "Scalable, High-Quality Object Detection," arXiv preprint arXiv:1412.1441, Dec. 9, 2015, 10 pages.

Vedaldi, A. et al., "MatConvNet—Convolutional Neural Networks for MATLAB," arXiv:1412.4564, May 5, 2016, 55 pages.

Volkovs, M. et al., "Effective Latent Models for Binary Feedback in Recommender Systems," SIGIR'15, ACM, Aug. 9-13, 2015, 10 pages.

Wang, C. et al., "Collaborative Topic Modeling for Recommending Scientific Articles," KDD'11, ACM, Aug. 21-24, 2011, 9 pages.

Weimer, M., et al., "CoFi$^{RANK}$—Maximum Margin Matrix Factorization for Collaborative Ranking," NIPS, 2007, 8 pages.

Elkahky, A. et al., "A Multi-View Deep Learning Approach for Cross Domain User Modeling in Recommendation Systems," Proceedings of the 24th International Conference on World Wide Web, May 22, 2015, pp. 278-288.

European Patent Office, Extended European Search Report and Opinion, EP Patent Application No. 16877055.0, dated Jul. 8, 2019, 11 pages.

Kim, E. et al., "Collaborative Filtering Based on Neural Networks Using Similarity," Serious Games, vol. 3498, Jan. 1, 2005, pp. 355-360.

Kim, M. et al., "Collaborative Filtering for Recommendation Using Neural Networks," Serious Games, vol. 3480, Jan. 1, 2005, pp. 127-136.

Wang, H. et al., "Collaborative Deep Learning for Recommender Systems," Knowledge Discovery and Data Mining, Aug. 10, 2015, pp. 1235-1244.

* cited by examiner

Rating Matrix 250A

|  | User 1 |  |  |  |  |  |  |  |  | ... | User n |
|---|---|---|---|---|---|---|---|---|---|---|---|
| Item m |  |  | 3 | 1 |  |  |  |  |  | ... | 1 |
| ⋮ | ⋮ | ⋮ | ⋮ | ⋮ | ⋮ | ⋮ | ⋮ | ⋮ | ⋮ | ⋮ | ⋮ |
|  |  | 1 |  |  | 4 |  | 1 |  |  | ... | 2 |
|  | 5 |  |  | 2 |  | 3 | 1 |  |  | ... |  |
|  | 2 |  | 5 | 1 |  | 0 |  | 3 |  | ... | 1 |
|  | 1 |  | 4 |  | 3 |  | 3 | 1 |  | ... |  |
|  |  | 3 |  | 2 |  |  | 2 |  |  | ... | 2 |
| Item 1 | 5 | 1 |  |  | 1 |  | 5 |  |  | ... | 1 |

| Model | Recall@200 |
|---|---|
| LDA | 0.7 |
| WMF | 0.82 |
| CTR | 0.86 |
| SVD | 0.77 |
| DNN-R | 0.85 |
| DNN-SVD | 0.85 |
| DNN-CONT | 0.87 |

FIG. 7

END-TO-END DEEP COLLABORATIVE FILTERING

CROSS-REFERENCE TO RELATED APPLICATIONS

This application claims the benefit of and priority to U.S. Provisional Application No. 62/387,493, filed Dec. 23, 2015, which is hereby incorporated by reference in its entirety.

BACKGROUND

This invention relates generally to generating recommendations, and more particularly to generating recommendations for users of online systems.

Online systems manage and provide various items to users of the online systems for users to interact with. As users interact with the content items, users may express or reveal preferences for some items over others. The items may be entertainment content items, such as videos, music, or books, or other types of content, such as academic papers, electronic commerce (e-commerce) products. It is advantageous for many online systems to include recommendation systems that suggest relevant items to users for consideration. Recommendation systems can increase frequency and quality of user interaction with the online system by suggesting content a user is likely to be interested in or will interact with. For example, a recommendation system included in a video streaming server may identify and suggest movies that a user may like based on movies that the user has previously viewed.

In general, models for recommendation systems use preference information between users and items of an online system to predict whether a particular user will like an item. Items that are predicted to have high preference for the user may then be suggested to the user for consideration. However, recommendation systems may have millions of users and items in the online system, and also receive streams of new users and items that need to be quickly and effectively incorporated into the recommendation system. Moreover, user preference information is sparse because of the very large number of content items. In addition, predictions should be effectively generated for new users or items that the online system has no user preference information for. Thus, recommendation systems need to generate effective recommendations for both existing and new users and items while relying on incomplete or absent preference information.

SUMMARY

A recommendation system generates recommendations for an online system using one or more neural network models that predict preferences of users for items in the online system. The neural network models generate a latent representation of a user and a latent representation of an item that can be combined to determine the expected preference of the user to the item. The latent representations are termed a latent item vector and a latent user vector. In one embodiment, the expected preference is determined from the latent vectors by a mathematical formula, such as a dot product, which may obviate more complex techniques for combining latent representations. Additionally, the neural network models that generate the latent vectors may be jointly trained using prior preference information to generate latent vectors for which the mathematical formula generates the preference information.

By using neural network models, the recommendation system can generate predictions in real-time for new users and items without the need to re-calibrate the models by making forward passes through the models to generate a latent representation (in the latent vector) of a user or item. Moreover, the recommendation system can easily incorporate other forms of information other than preference information to generate improved preference predictions by including the additional information to generate the latent vector description of the user or item. In one embodiment, these include characteristics of users and items.

In one embodiment, the recommendation system characterizes a user as a set of user descriptors, and characterizes an item as a set of item descriptors. The user descriptors and item descriptors are used as inputs to the model generating the latent vectors. In one embodiment, the user descriptors include a user preference vector identified from the known preference information that indicates preferences of the user for one or more other items, and a user content vector that indicates characteristics of the user such as age, gender, interests, or other features. The item descriptors include an item preference vector identified from the known preference information that indicate preferences for the item by one or more other users, and an item content vector that describes characteristics of the item. Characteristics of the item may depend on the type of item. Thus, the characteristics for a movie characterized in the item content vector may describe a title of a movie, names of actors and actresses in the movie, topics in the movie, a summary of the movie, and the like.

In one embodiment, the user descriptors also include a rated item vector describing the items for which there is preference information for the user. The rated item vector allows the recommendation system to represent the user in terms of the items for which the user's preferences are known. The item descriptors may also include a rating user vector describing the users that rated the item. The rating user vector allows the recommendation system to represent the item in terms of the users that are associated with preference information for the item.

In one embodiment, the descriptors are extracted such that the item preference vector has the same length as the user preference vector, the item content vectors have the same dimensionality as the rated item vectors, and the user content vectors have the same length as the rating user vectors. As one example, user and item preference vectors of the same length for a particular user and item can be generated by identifying the item preference vector as the list of preferences for the item across different users of the online system, and identifying the user preference vector as a weighted sum of the list of preferences for items that the user has preference information for. The resulting user and item preference vectors contain preference information of both the particular user and item, while both having the same length related to the number of users in the online system.

The recommendation system applies one or more neural network models to the item descriptors and user descriptors to generate a latent item vector and a latent user vector. The item descriptors applied to a neural network model generates the latent item vector, and the user descriptors applied to a neural network model generates the latent user vector. As discussed below, one or more models may be shared between the user and item. The latent user vector and the latent item vector are alternate representations of the user and the item generated by the neural network models. The latent user vector and the latent item vector are combined to generate a preference prediction for the item. By using neural network models, the recommendation system can determine predictions in real-time for new users or items by identifying relevant descriptors for the new users or items, and applying the neural network models to the identified descriptors to generate the latent user vector and latent item vectors without the need for re-training the models. Since the input descriptors include preference information as well as descriptions of the content, when some of the descriptors are absent (e.g., no preference information for a new user) the model can automatically account for the absent data by generating a latent vector using the existing descriptor data. As another example, when a user expresses preferences for content, that user's descriptors are updated with the additional preferences, and a forward pass through the model may generate an updated latent user representation to quickly generate updated recommendations for the user without retraining the model itself. In addition, the updated latent user representation may be used to quickly generate updated recommendations for a very large number of content items because the generation of a new expected preference is generated by combining the updated user representation with an item representation. As the combination may be a simple mathematical formula, such as a dot product, this may be performed for a large number of content items more quickly compared to alternatives that use neighborhood preference estimation or other more complex formula for generating a prediction.

In one embodiment, each type of descriptor is applied to a trained model for that type of descriptor before a unified model combines the descriptors to determine the latent vector. For example, the item content vector may be applied to a model for that descriptor and the item preference vector may be applied to a different model for that descriptor before the outputs are combined (for example by a unified model for the various descriptors) to generate the latent vector.

In one embodiment, the models used to generate the latent user and latent item vectors are shared between user descriptors and item descriptors when the lengths of the vectors in the user descriptors and the item descriptors are the same. Sharing models between the user and item descriptors allow the recommendation system to achieve improved computational efficiency in training the model because the recommendation system can use and train a fewer number of models in a shorter amount of time.

BRIEF DESCRIPTION OF THE DRAWINGS

FIG. 3 illustrates an example rating matrix, in accordance with an embodiment.

FIG. 4C illustrates user descriptor vectors, in accordance with an embodiment.

FIG. 7 shows performance results of example predictive models presented herein compared to that of other models.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
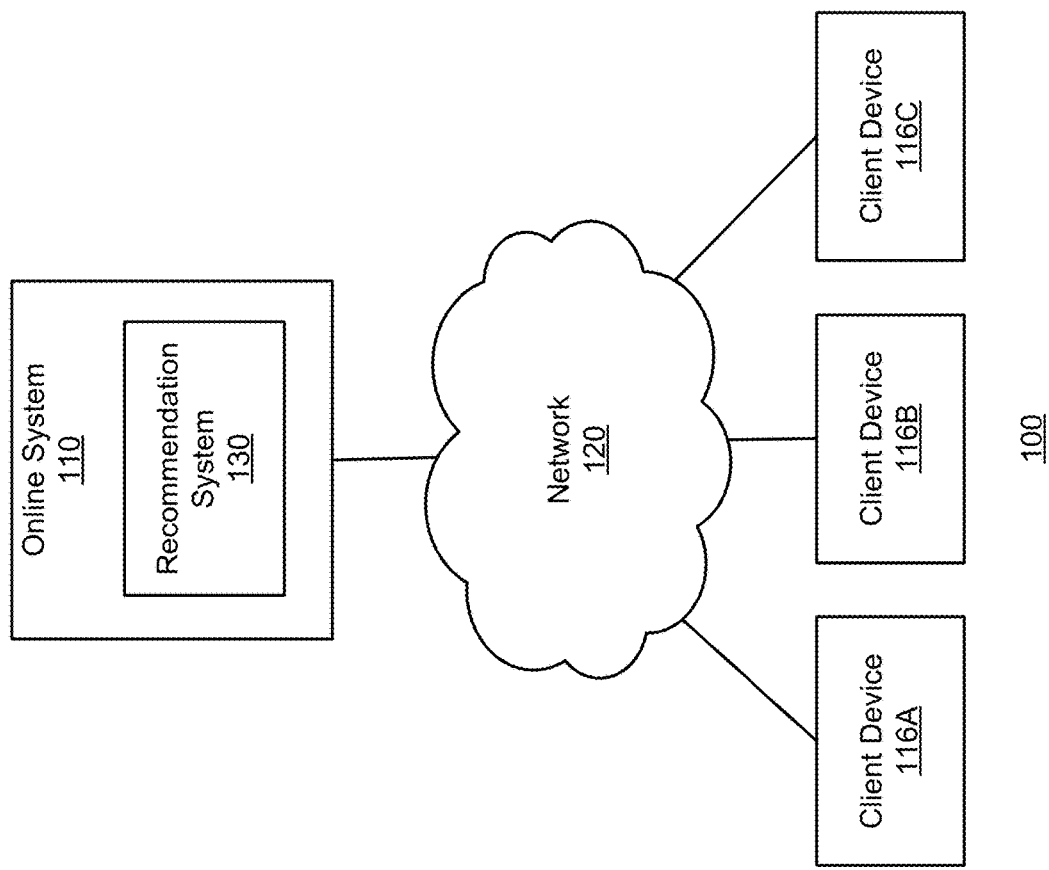
FIG. 1 is a high level block diagram of a system environment for a recommendation system, in accordance with an embodiment.

FIG. 1 is a high level block diagram of a system environment for a recommendation system 130, in accordance with an embodiment. The system environment 100 shown by FIG. 1 includes one or more client devices 116, a network 120, and an online system 110 that includes a recommendation system 130. In alternative configurations, different and/or additional components may be included in the system environment 100.

The online system 110 manages and provides various items to users of the online systems for users to interact with. For example, the online system 110 may be a video streaming system, in which items are videos that users can upload, share, and stream from the online system 110. As another example, the online system 110 may be an e-commerce system, in which items are products for sale, and sellers and buyers can browse items and perform transactions to purchase products. As another example, the online system 110 may be article directories, in which items are articles from different topics, and users can select and read articles that are of interest.

The recommendation system 130 identifies relevant items that users are likely to be interested in or will interact with and suggests the identified items to users of the online system 110. It is advantageous for many online systems 110 to suggest relevant items to users because this can lead to increase in frequency and quality of interactions between users and the online system 110, and help users identify more relevant items. For example, a recommendation system 130 included in a video streaming server may identify and suggest movies that a user may like based on movies that the user has previously viewed. Specifically, the recommendation system 130 may identify such relevant items based on preference information received from users as they interact with the online system 110. The preference information contains preferences for some items by a user over relative to other items. The preference information may be explicitly given by users, for example, through a rating survey that the recommendation system 130 provides to users, and/or may be deduced or inferred by the recommendation system 130 from actions of the user. Depending on the implementation inferred preferences may be derived from many types of actions, such as those representing a user's partial or full interaction with a content item (e.g., consuming the whole item or only a portion), or a user's action taken with respect to the content item (e.g., sharing the item with another user).

The recommendation system 130 uses models to predict whether a particular user will like an item based on preference information. Items that are predicted to have high preference by the user may then be suggested to the user for consideration. The recommendation system 130 may have millions of users and items of the online system 110 for which to generate recommendations and expected user preferences and may also receive new users and items for which to generate recommendations. Moreover, preference information is often significantly sparse because of the very large number of content items. Thus, the recommendation system 130 generates recommendations for both existing and new users and items based on incomplete or absent preference information.

In one embodiment, the recommendation system 130 generates recommendations for the online system 110 using one or more neural network models. The neural network models generate a latent vector representation of a user and of an item that can be combined to determine the expected preference of the user to the item. By using neural network models to generate these latent vectors, the recommendation system 130 can generate predictions in real-time for new users and items without the need to re-calibrate the models. Moreover, the recommendation system 130 can incorporate other forms of information other than preference information to generate improved preference predictions by including the additional information to generate the latent description of the user or item. For example, these may include demographic information such as age, gender, hometown, and the like for users of the online system 110, or metadata, such as title of movie, name of main actress in the movie, and the like for items of the online system 110.

The client devices 116 are computing devices that display information to users and communicates user actions to the online system 110. While three client devices 116A, 116B, 116C are illustrated in FIG. 1, in practice many client devices 116 may communicate with the online system 110 in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the online system 110. For example, a client device 116 executes a browser application to enable interaction between the client device 116 and the online system 110 via the network 120. In another embodiment, the client device 116 interacts with the online system 110 through an application programming interface (API) running on a native operating system of the client device 116, such as IOS® or ANDROID™.

The client device 116 allows users to perform various actions on the online system 110, and provides the action information to the recommendation system 130. For example, actions information for a user may include a list of items that the user has previously viewed on the online system 110, search queries that the user has performed on the online system 110, items that the user has uploaded on the online system 110, and the like. Action information may also include information on user actions performed on third party systems. For example, a user may purchase products on a third-party website, and the third-party website may provide the recommendation system 130 with information on which user performed the purchase action.

The client device 116 can also provide social information to the recommendation system 130. For example, the user of a client device 116 may permit the application of the online system 110 to gain access to the user's social network profile information. Social information may include information on how the user is connected to other users on the social networking system, the content of the user's posts on the social networking system, and the like. In addition to action information and social information, the client device 116 can provide other types of information, such as location information as detected by a global positioning system (GPS) on the client device 116, to the recommendation system 130.

In one embodiment, the client devices 116 also allow users to rate items and provide preference information on which items the users prefer over the other. For example, a user of a movie streaming system may complete a rating survey provided by the recommendation system 130 to indicate how much the user liked a movie after viewing the movie. For example, the survey may request the user of the client device 116B to indicate the preference using a binary scale of "dislike" and "like," or a numerical scale of 1 to 5 stars, in which a value of 1 star indicates the user strongly disliked the movie, and a value of 5 stars indicates the user strongly liked the movie. However, many users may rate only a small proportion of items in the online system 110 because, for example, there are many items that the user has not interacted with, or simply because the user chose not to rate items.

Preference information is not necessarily limited to explicit user ratings and may also be included in other types of information, such as action information, provided to the recommendation system 130. For example, a user of an e-commerce system that repeatedly purchases a product of a specific brand indicates that the user strongly prefers the product, even though the user may not have submitted a good rating for the product. As another example, a user of a video streaming system that views a video only for a short amount of time before moving onto the next video indicates that the user was not significantly interested in the video, even though the user may not have submitted a bad rating for the video.

The client devices 116 also receive item recommendations for users that contain items of the online system 110 that users may like or be interested in. The client devices 116 may present recommendations to the user when the user is interacting with the online system 110, as notifications, and the like. For example, video recommendations for a user may be displayed on portions of the website of the online system 110 when the user is interacting with the website via the client device 116. As another example, client devices 116 may notify the user through communication means such as application notifications and text messages as recommendations are received from the recommendation system 130.

Figure 2:
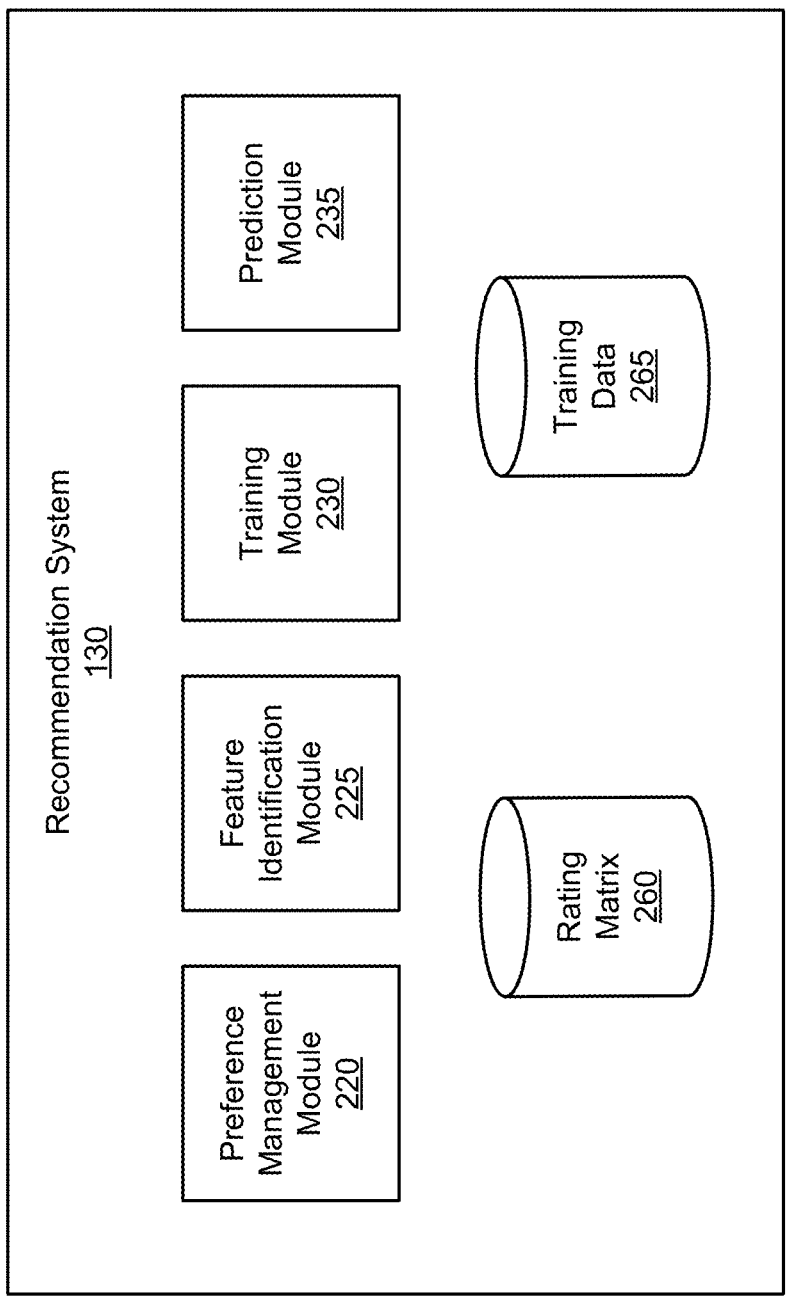
FIG. 2 is an example block diagram of an architecture of the recommendation system, in accordance with an embodiment.

FIG. 2 is an example block diagram of an architecture of the recommendation system 130, in accordance with an embodiment. The recommendation system 130 shown by FIG. 2 includes a preference management module 220, a feature identification module 225, a training module 230, and a prediction module 235. In alternative configurations, different and/or additional components may be included in the system environment 100.

The preference management module 220 manages preference information for users of the online system 110. Specifically, the preference management module 220 may manage a set of n users u=1, 2, . . . , n and a set of m items v=1, 2, . . . , m of the online system 110. In one embodiment, the preference management module 220 represents the preference information as a ratings matrix database 250. The ratings matrix database 250 is a matrix array R of elements consisting of n rows and m columns, in which each row u corresponds to user u, and each column v corresponds to item v. Each element R(u, v) corresponds to a rating value that numerically indicates the preference of user u for item v based on a predetermined scale. Since the number of users and items may be significantly large, and ratings may be unknown for many users and items, the rating matrix database 250 is, in general, a high-dimensional sparse matrix. Though described herein as a matrix, the actual structural configuration of the ratings matrix database 250 may vary in different embodiments to alternatively describe the preference information. As an example, user preference information may instead be stored for each user as a set of preference values for specified items. These various alternative representations of preference information may be similarly used for the analysis and preference prediction described herein.

As shown for this example rating matrix 250, each row R(u, :) corresponds to a collection of ratings for the user u across the different items of the online system 110 that indicate which items the user has rated, along with the preference for those items. Similarly, each column R(:, v) corresponds to a collection of ratings for item v across different users of the online system 110 that indicate which users have rated the item, along with their preference for that item.

The preference management module 220 determines ratings for users and items in the rating matrix 250A from the preference information received from the plurality of client devices 116. In one embodiment, the preference management module 220 populates the rating matrix 250 with user preferences that were expressed by the user through rating surveys, and the like. For example, the preference management module 220 may receive user ratings based on a scale of 1 to 5 for a list of movies in the online system 110, and populate the rating matrix 250 with values of the ratings for the corresponding user and movie. In another embodiment, when explicit user preferences are unknown, the preference management module 220 determines estimated ratings for the users based on information such action information, and populates the rating matrix 250 with the estimated ratings. For example, the preference management module 220 may populate the ratings matrix 250 with a binary value of 1 for a corresponding user and movie if there is an indication the user views the movie for a repeated number of times, or a binary value of 0 if the user stops viewing the video before the video has finished playing. As another example, the preference management module 220 populates the rating matrix 260 with rankings that represent the order in which a user prefers the set of items in the online system 110. As an alternative, the ratings matrix 250 may be received from an external system to the recommendation system 130. For example, in embodiments in which the recommendation system 130 is a separate system from the online system 110.

FIG. 3 illustrates an example rating matrix 250A for a video streaming system, in accordance with an embodiment. As shown in FIG. 3, each row corresponds to a user in the video streaming system, and each column corresponds to a video item in the system. Each rating is a numerical value 1 to 5, in which 1 indicates a strong dislike of the item, and 5 indicates a strong like of the item. For example, user n has a low preference for video item 1, as shown by the rating value of 1, while user 2 has a high preference for item 1. In addition, many users and items have missing ratings, as the preference information for the corresponding user and item are unknown.

In one embodiment, the preference management module 220 factorizes the rating matrix 260 using matrix factorization techniques, and may store the factorized matrices as the rating matrix database 260. In one implementation, the rating matrix R is decomposed using singular value decomposition (SVD), and is represented by:

$$R = A\Sigma B^T$$

where A, $\Sigma$, and B are stored as the factorized matrices. In another implementation, "truncated" versions of the factorized matrices $A_K$, $\Sigma_K$, and $B_K$ are stored, in which $A_K$, $\Sigma_K$, and $B_K$ correspond to portions of the factorized matrices with the K-highest singular values. The truncated representation of the rating matrix 260 is advantageous when the dimensionality of the matrix 250 is significantly high, and the users and items have to be represented in a compressed format for improving computational efficiency.

Returning to FIG. 2, the feature identification module 225 identifies a set of descriptors for users and items that are indicative of predicting unknown preferences between the users and items. In one embodiment, the feature identification module 225 characterizes a user as a set of user descriptors, and an item as a set of item descriptors.

Figure 4A:
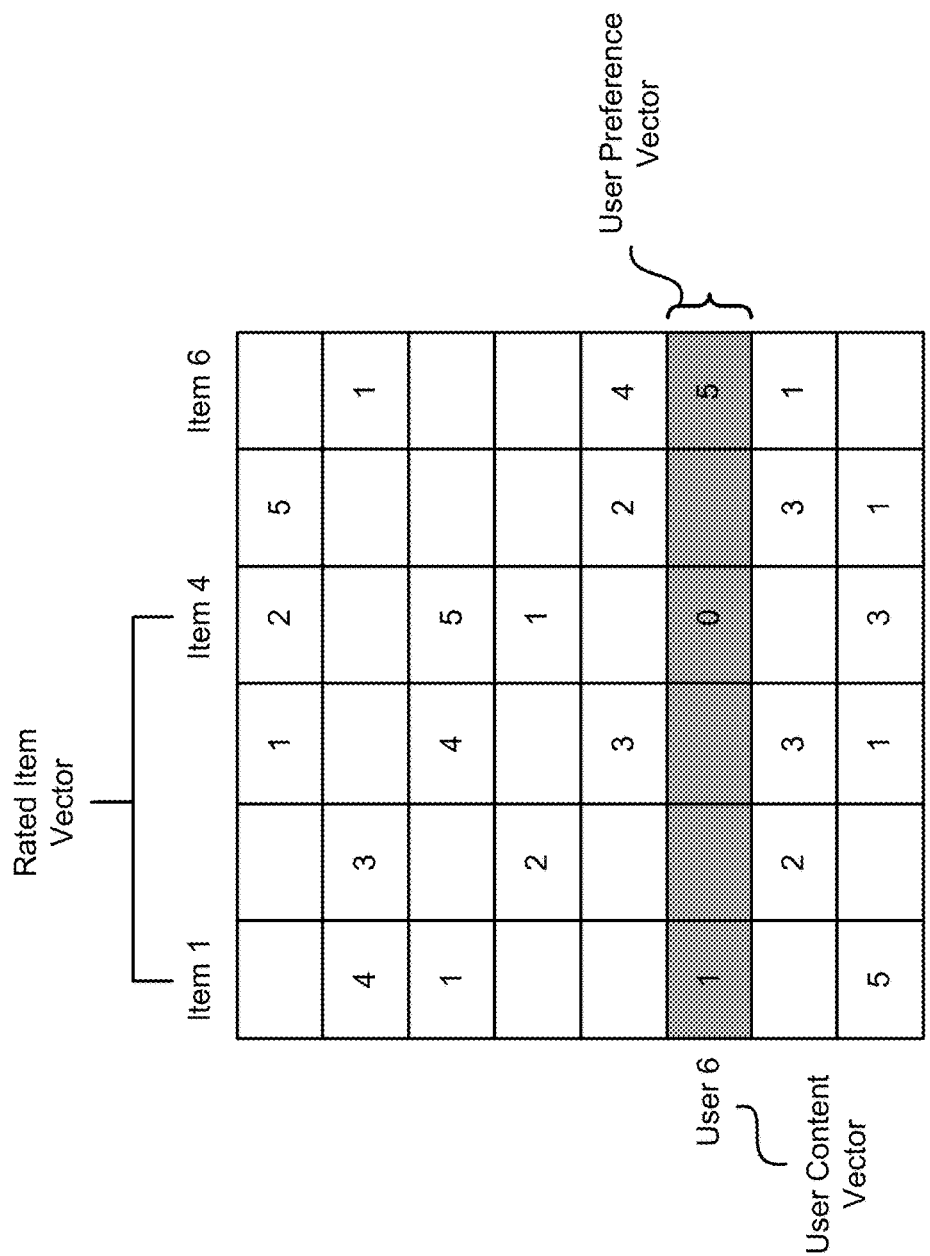
FIG. 4A illustrates item descriptor vectors, in accordance with an embodiment.
Figure 4B:
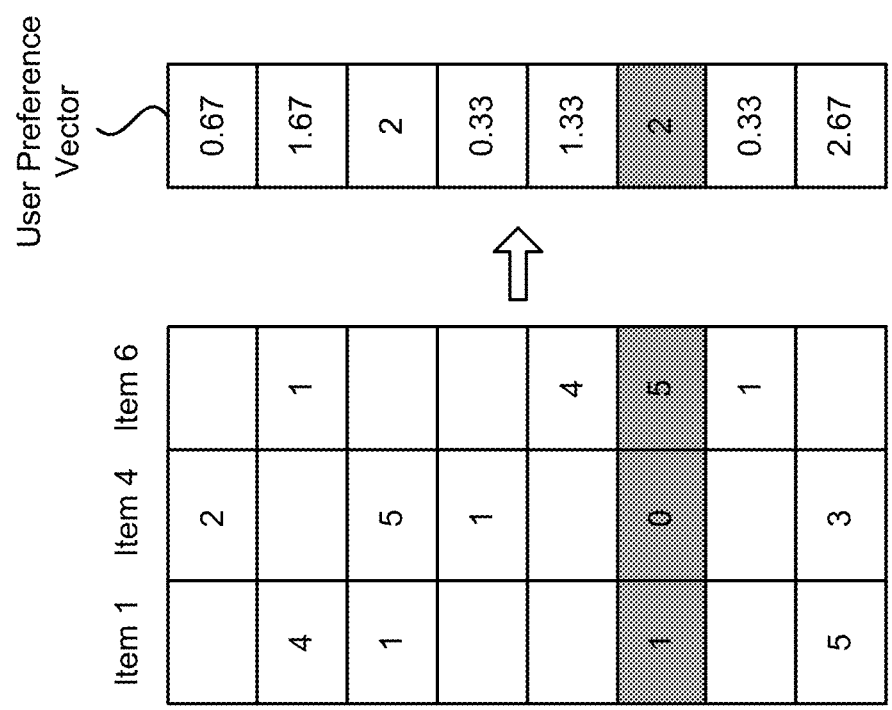
FIG. 4B illustrates item preference vectors, in accordance with another embodiment.

FIGS. 4A and 4B illustrate example user descriptor vectors. The user descriptors include a user preference vector $\Phi_R^U(u)$ identified from known preference information for user u. In one embodiment, the feature identification module 225 identifies the user preference vector $\Phi_R^U(u)$ as the row R(u, :) of the rating matrix 250 for a user u that indicates which items the user has ratings for and the value of the ratings. In other words, the user preference vector can be given by:

$$\Phi_R^U(u,:) = R(u,:). \tag{1}$$

As shown in FIG. 4A, the user preference vector for user 6 indicates that user 6 has rated item 1, a Batman movie, item 4, a Superman movie, and item 6, a romantic comedy movie, in which the user has a strong preference for item 6, and a relatively low preference for items 1 and 4. Such a user preference vector may give insight into other users in the online system 110 that have similar preferences as user 6. For example, another user having a similar preference vector as $\Phi_R^U(u)$ may indicate that the other user has similar interests in movies as user 6, and thus, user 6 is likely to have a positive preference for items that the other user has rated highly.

In another embodiment, the feature identification module 225 identifies the user preference vector $\Phi_R^U(u)$ as a weighted sum of the columns of the rating matrix that correspond to items that the user has ratings for. Specifically, the user preference vector $\Phi_R^U(u)$ can be identified as:

$$\Phi_R^U(u) = \sum_{v' \in V(u)} w_{uv'} \cdot R(:,v')^T \tag{2A}$$

where V(u) indicates the set of items that user u has ratings for, and $w_{uv'}$ indicates a weight for a corresponding item v' in the set of items V(u). As shown in FIG. 4B, since user 6 has ratings for items 1, 4, and 6, the user preference vector for user 6 can be generated by taking the average of the columns of the rating matrix corresponding to items 1, 4, and 6.

In one embodiment, when the number of users n is significantly high, the user preference vector $\Phi_R^U(u)$ can be identified as:

$$\Phi_R^U(u) = \sum_{v' \in V(u)} w_{uv'} \cdot B_K(v', :)^T. \tag{2B}$$

Since $B_K$ is a truncated factorization matrix of the rating matrix R, the vector $B_K(v', :)$ represents a compressed representation of the column vector for item v' from R(v', :).

The user descriptors also include a set of $K_U$ user content vectors $\{\Phi_i^U(u)\}_{i=1, 2, \ldots, K_U}$ that describes various characteristics of the user. Specifically, the set of user content vectors $\{\Phi_i^U(u)\}_{i=1, 2, \ldots, K_U}$ may contain information describing the user, other than the preference information, that may be indicative of the types of items that the user might be interested in. The user content vectors may include demographic data on the user, such as age, gender, marital status, occupation, education level. The user content vectors may also include social data on the user, such as the content of the users' post on social networking systems, the demographic characteristics of the users' social network circle, and the like. For example, returning to the example user in FIG. 4A, the social data for user 6 may have indications that user 6 is interested in superhero and crime movies.

In one embodiment, the user descriptors may also include a rated item vector describing the items for which there is preference information for the user. The rated item vector allows the recommendation system to represent the user in terms of the items for which the user's preferences are known. The item descriptors may also include a rating user vector describing the users that rated the item. The rating user vector allows the recommendation system to represent the item in terms of the users that are associated with preference information for the item.

Figure 4C:
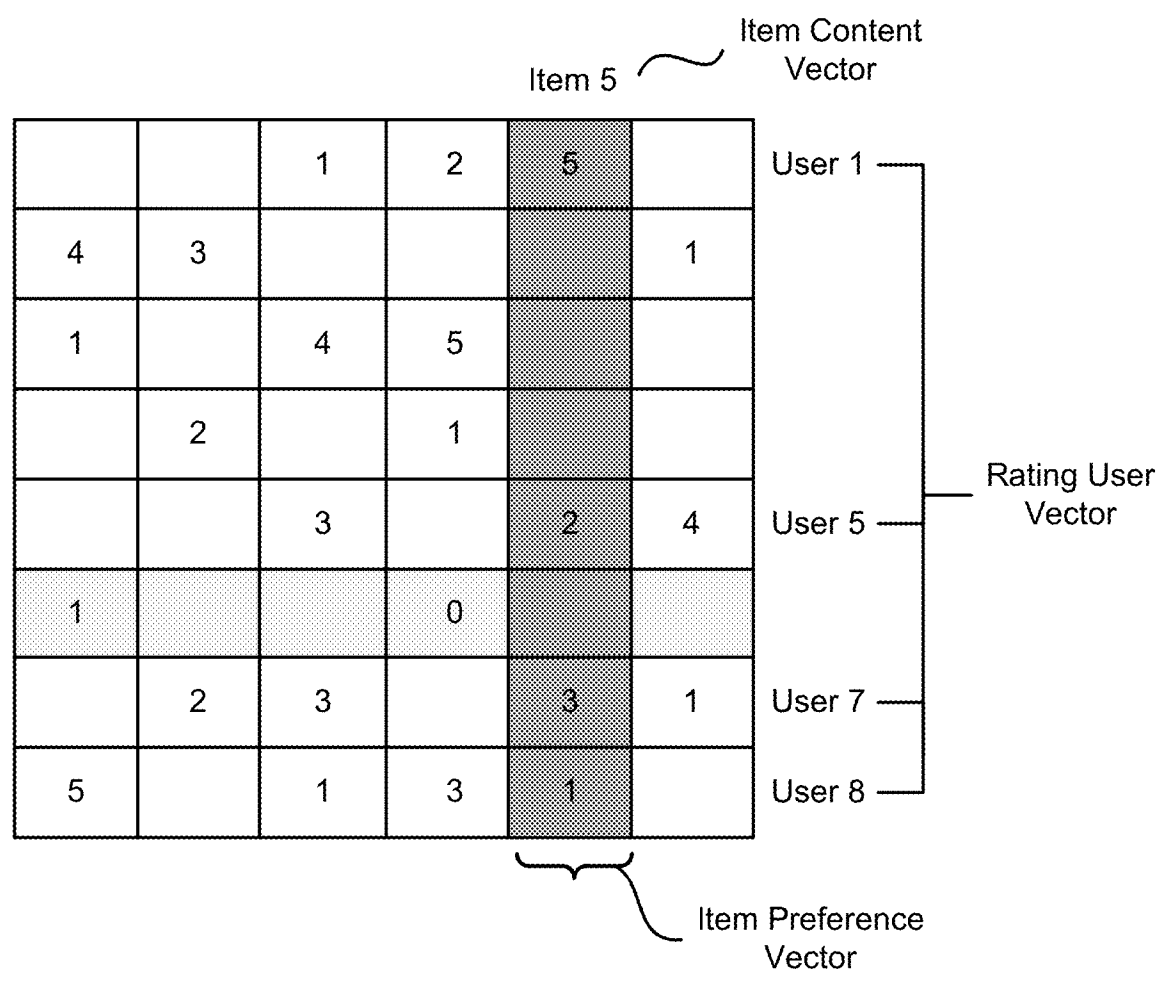
Figure 4D:
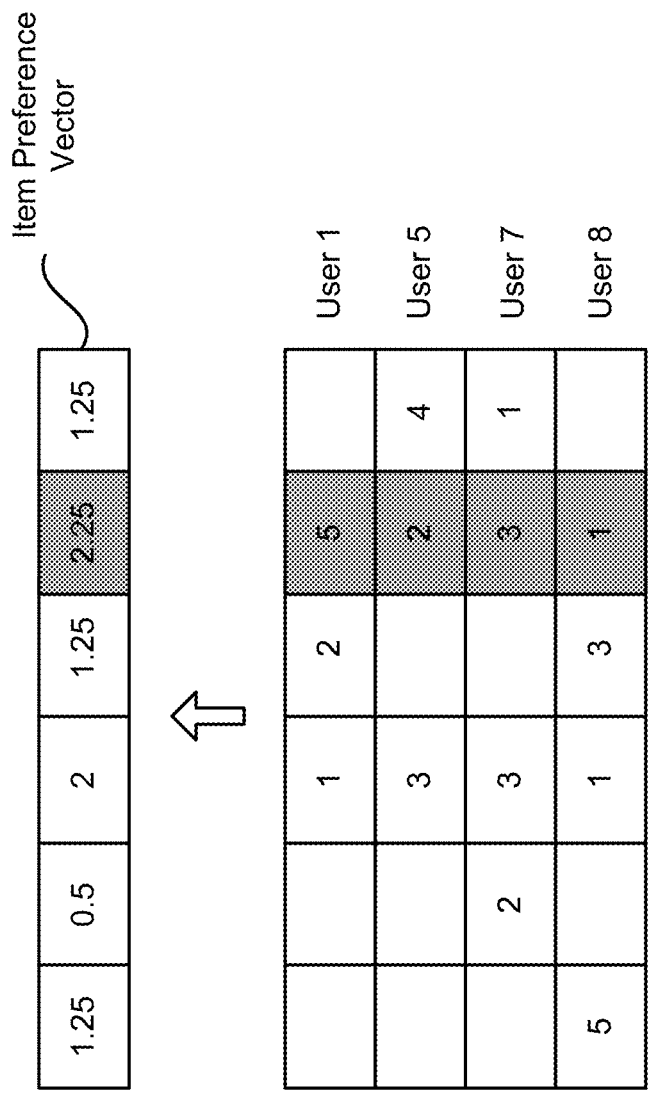
FIG. 4D illustrates user preference vectors, in accordance with another embodiment.

FIGS. 4C and 4D illustrate example item descriptor vectors. The item descriptors include an item preference vector $\Phi_R^V(v)$ identified from known preference information for item v. In one embodiment, the feature identification module 225 identifies the item preference vector $\Phi_R^V(v)$ as the column R(:, v) of the rating matrix 250 for an item v that indicate which users have ratings for the item v and the values of the ratings. In other words, the item preference vector can be given by:

$$\Phi_R^V(v) = R(:,v)^T. \tag{3A}$$

As shown in FIG. 4C, the item preference vector for item 5 indicates that users 1, 5, 7, and 8 have ratings for item 5, in which the user 1 has a strong preference, user 7 has a neutral preference, and users 5 and 8 have a relatively low preference for item 5. Such an item preference vector may give insight into other items in the online system 110 that are similar to item 5. For example, another item having a similar item preference vector as $\Phi_R^V(v)$ may indicate that the other item is similar to item 5 since the users who have positive preferences for the other item tend to have positive preferences for item 5, and users who have negative preferences for the other item tend to have negative preferences for item 5.

In one embodiment, the item preference vector can be given by:

$$\Phi_R^V(v) = B_K(v,:)^T. \tag{3B}$$

As discussed previously in reference to equation (2B), since $B_K$ is a truncated factorization matrix of the rating matrix R, the vector $B_K(v, :)^T$ represents a compressed representation of item v.

In another embodiment, the feature identification module 225 identifies the item preference vector $\Phi_R^V(v)$ as a weighted sum of the rows of the rating matrix that correspond to users that have ratings for item v. Specifically, the item preference vector $\Phi_R^V(v)$ can be identified as:

$$\Phi_R^V(v) = \sum_{u' \in U(v)} w_{u'v} \cdot R(u', :) \tag{4}$$

where U(v) indicates the set of users that have ratings for item v, and $w_{u'v}$ indicates a weight for a corresponding user u' in the set of users U(v). As shown in FIG. 4D, since item 5 has ratings from users 1, 5, 7, and 6, the item preference vector for item 5 can be generated by taking the average of the rows of the rating matrix R corresponding to users 1, 5, 7, and 6.

The item descriptors also include a set of $K_V$ item content vectors $\{\Phi_i^V(v)\}_{i=1, 2, \ldots, K_V}$ that describes various characteristics of the item. Specifically, the set of item content vectors $\{\Phi_i^V(v)\}_{i=1, 2, \ldots, K_V}$ may contain information on the item other than the preference information that may be indicative of whether a particular user is interested in the item. The item content vectors may include metadata on the item, such as title of movie, name of actress in the movie, length of movie. The item content vectors may also include information on the content of the item, such as style of the image or video, presence of a particular character in the movie, and types of music embedded in the movie. For example, returning to the example item in FIG. 4C, an example item content vector may be an indication of whether a superhero character is present in the movie or whether a particular actress or actor starts in the movie.

In one embodiment, the user descriptors may also include a set of rated item vectors $\{\Phi_i^{VU}(u)\}_{i=1, 2, \ldots, K_V}$ describing the characteristics of items that the user u has ratings for. The rated item vector allows user u to be represented in terms of the characteristics of items that the user has rated. Returning to the example of FIG. 4A, user 6 may also be represented in terms of the characteristics identified for items 1, 4, and 6. For example, user 6 may be identified to have strong preferences for movies that have upbeat music, feature a particular actress, and the like. In one embodiment, the feature identification module 225 identifies each rated item vector as a weighted average of the item content vectors for the items that user u has preference information for. In other words, each rated item vector may be given by:

$$\Phi_i^{VU}(u) = \sum_{v' \in V(u)} w_{uv'} \cdot \Phi_i^V(v'). \tag{5}$$

In one embodiment, the item descriptors may also include a set of rating user vectors $\{\Phi_i^{UV}(v)\}_{i=1, 2, \ldots, K_U}$ describing the users that rated the item. The rating user vector allows the recommendation system 130 to represent the item in terms of the users that are associated with preference information for the item. Returning to the example of FIG. 4C, item 5 may also be represented in terms of the characteristics identified for users 1, 5, 7, and 8 who have ratings for the item. For example, users who are female and 20-30 years old may be identified to have strong preferences for item 5. In one embodiment, the feature identification module 225 identifies each rating user vector as a weighted sum of the user content vectors for the users that have preference information for item v. In other words, each rating user vector may be given by:

$$\Phi_i^{UV}(v) = \sum_{u' \in U(u)} w_{u'v} \cdot \Phi_i^U(u'). \qquad (6)$$

Returning to FIG. 2, the training module 230 constructs one or more predictive models that predict ratings for users and items. Specifically, the predictive models predict an unknown rating estimate S(u,v) for user u and item v at least based on the preference information in the rating matrix R.

In one embodiment, the predictive models are neighborhood-based models that generate predictions for ratings based on other users that have ratings for item v, or other items that user u has ratings for. In one instance, the neighborhood-based model is a user-based model in which the estimated rating S(u,v) is generated by comparing user u with other users in the online system 110 that have ratings for item v. In one embodiment, the training module 230 constructs a user-based model as:

$$S(u, v) = \frac{\sum_{u' \in U(v)} R(u', v) \cdot (R(u, :) \cdot R(u', :)^T)}{\sum_{u' \in U(v)} R(u, :) \cdot R(u', :)^T}. \qquad (7)$$

The model shown in equation (7) indicates that the estimated rating should be high if other users who have ratings similar to user u had high ratings for item v, and the estimated rating should be low if the other users had low ratings for item v.

The user-based model in equation (7) is related to the user preference vector in equation (1) and the item preference vector in equation (4) in that the numerator of the user-based model is the dot product of the user preference vector of equation (1) and the item preference vector of equation (4), in which the weights are the known ratings R(u',v) for other users u' and item v.

In another instance, the neighborhood-based model is an item-based model in which the estimated rating S(u,v) is generated by comparing item v with other items in the online system 110 that user u has ratings for. In one embodiment, the training module 230 constructs an item-based model as:

$$S(u, v) = \frac{\sum_{v' \in V(u)} R(u, v') \cdot (R(:, v)^T \cdot R(:, v'))}{\sum_{v' \in V(u)} R(:, v)^T \cdot R(:, v')}. \qquad (8)$$

The model shown in equation (8) indicates that the estimated rating should be high if other items that are similar to item v have high ratings from user u, and the estimated ratings should be low if the other items have low ratings from user u.

The user-based model in equation (8) is related to the user preference vector in equation (2A) and the item preference vector in equation (3A) in that the numerator of the user-based model is the dot product of the user preference vector of equation (2A) and the item preference vector of equation (3A), in which the weights are the known ratings R(u, v') for other user u and other items v'.

In one embodiment, the predictive models are one or more machine-learned models. The machine-learned models may predict the rating S(u,v) for user u and item v, given the set of user descriptors and item descriptors identified for user u and item v. The relationship between ratings, users, and items are learned from a training data store 265.

Specifically, the training data store 265 contains a set of multiple data instances T, in which each data instance t corresponds to a user u' and item v' that have known ratings in rating matrix R. Specifically, the data instance t contains a triplet ($d_U(u')$, $d_v(v')$, R(u',v')) that includes user descriptors $d_U(u')$ of user u', item descriptors $d_v(v')$ of item v' that are both identified by the feature identification module 225, and the known rating value R(u',v') for the user and item. The relationship between users, as represented by the set of user descriptors, items, as represented by the set of item descriptors, and ratings can be learned from the collection of data instances in the training data store 265.

The training module 230 constructs the machine-learned models based on the training data store 265. The machine-learned model can be represented as a function g($d_U(u)$, $d_v(v)$; θ) that maps the user and item descriptors to the rating estimate S(u, v) for user u and item v. In general, the machine-learned model may be a parametric model in which one or more parameters θ specify the relationship between the set of user and item descriptors, and the rating for the user and item.

Typically, the training module 230 determines the value of the parameters θ of the parametric-type machine-learned model by minimizing a loss function l(R, S, T; θ) that represents discrepancies between known rating values R and estimated values of ratings S generated by the machine-learned model for one or more data instances T in the training data store 265. The training module 230 may minimize the loss function through gradient-based numerical optimization algorithms, such as batch gradient algorithms, stochastic gradient algorithms, and the like. In one particular implementation referred throughout the remainder of the specification, the loss function l(R, S, T; θ), u',v'∈T is the squared loss:

$$\ell(R(u', v'), S, T(u', v'); \theta) = \sum_{u',v' \in T} (R(u', v') - S(u', v'))^2. \qquad (9)$$

However, in practice, another loss function may be used.

In one embodiment, the machine-learned models include one or more neural network models f(·). Specifically, a neural network model maps a given input vector into a non-linear output by a series of transformations weighted by one or more parameters of the network. In general, the neural network models may be structured as feed-forward networks, such as artificial neural networks (ANN), convolutional neural networks (CNN), deep neural networks (DNN), and/or recurrent networks, such as long short-term memory networks (LSTM), bi-directional recurrent networks, deep bi-directional recurrent networks, and the like.

In one embodiment, the predictive model is a model that generates a rating estimate S(u, v) for user u and item v by combining a latent user vector $U(u, :)^T$ and a latent item vector $V(v, :)^T$ that are each alternate representations of the user and the item. The latent user vector is generated by applying the set of user descriptors to the neural network models, and the latent item vector is generated by applying the set of item descriptors to the neural network models. Thus, the latent user vector is a single vector representing the user based on the user's ratings and characteristics, and the latent item vector is a single vector representing the item based on the item's ratings and characteristics. The latent user vector and the latent item vector are combined for example, by a mathematical formula, to generate the rating prediction for user u and item v. Specifically, the mathematical formula that combines the latent item vector and the latent user vector may itself not be a trained mapping, but one selected to quickly generate the rating prediction from the latent user vector and the latent item vector. In one instance, the estimated rating S(u, v) can be represented by the dot product of the latent user vector and the latent item vector:

$$S(u,v) = U(u,:) \cdot V(v,:)^T. \qquad (10)$$

By using neural network models to generate the latent user vector and the latent item vector, the training module 230 can construct a predictive model that can incorporate various types of user and item information, such as user characteristics in the form of user content vectors, and item characteristics in the form of item content vectors, into the model for rating prediction. Moreover, generating separate latent representations for the users and the items and subsequently combining the representations through a simple mathematical formula allows the predictive model to quickly generate updated recommendations for a very large number of content items compared to alternatives that use neighbor similarity estimation or other more complex formula for generating a prediction.

In one embodiment, the latent user vector $U(u,:)^T$ is generated by a corresponding user neural network model $f_U(\cdot)$ with parameters $\theta_U$, and the latent item vector is generated by corresponding item neural network model $f_V(\cdot)$ with parameters $\theta_V$:

$$U(u,:) = f_U(d_U(u); \theta_U)$$

$$V(u,:) = f_V(d_V(v); \theta_V).$$

Thus, the estimated rating can be represented as:

$$S(u,v) = f_U(d_U(u); \theta_U) \cdot (f_V(d_V(v); \theta_V))^T \qquad (11)$$

where the set of parameters $\theta_U$, $\theta_V$ are determined through loss minimization.

Figure 5:
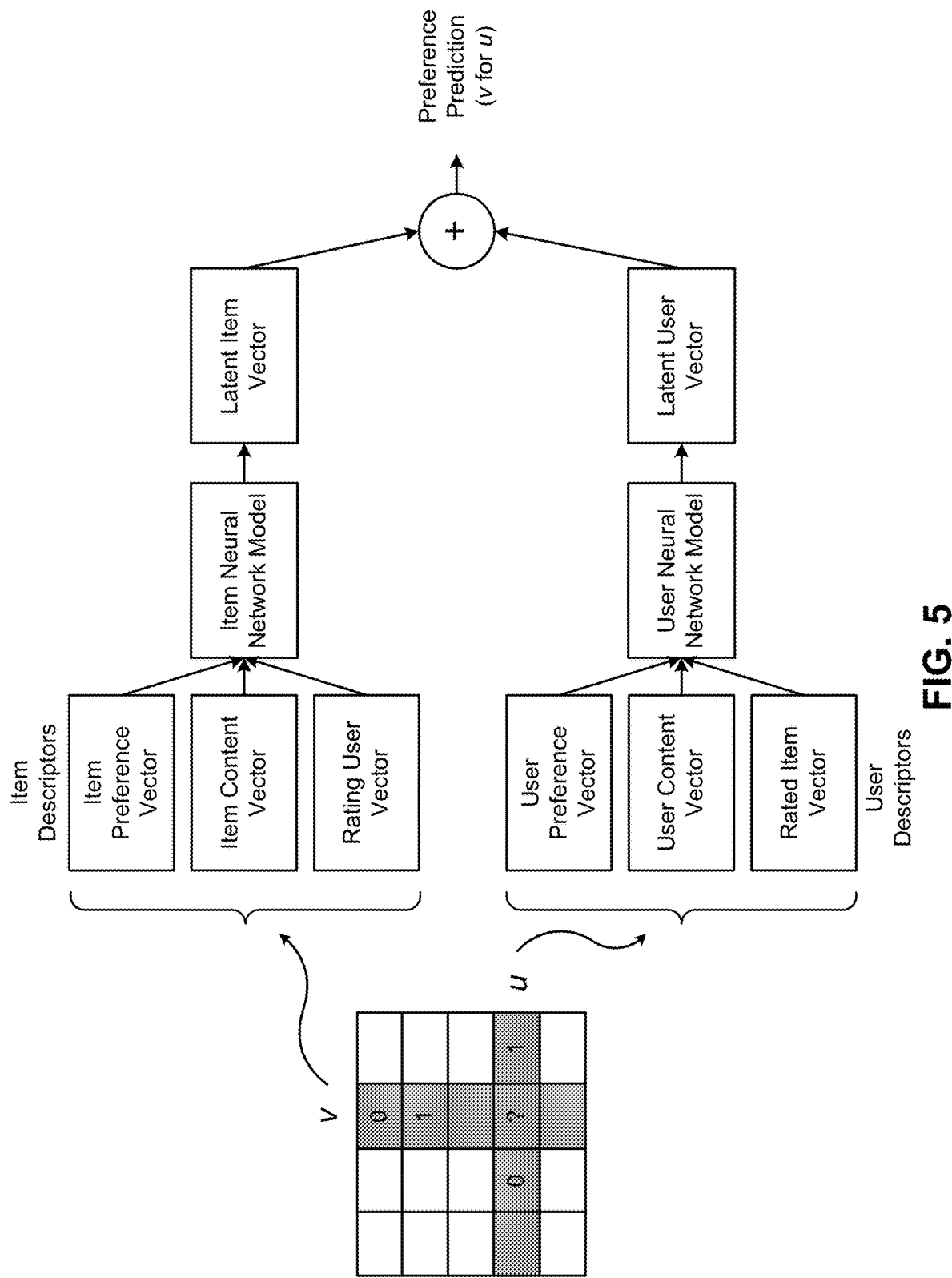
FIG. 5 shows an example predictive model, in accordance with an embodiment.

FIG. 5 shows an example predictive model, in accordance with an embodiment. As shown in FIG. 5, the latent item vector is generated by identifying the item descriptors from item v, and applying the item descriptors through the item neural network model. Similarly, the latent user vector is generated by identifying the user descriptors from user u, and applying the user descriptors through the user neural network model. The latent user vector and the latent item vector are then combined to generate the predicted rating for item v and user u.

In one implementation, the user neural network model $f_U(\cdot)$ and the item neural network model $f_V(\cdot)$ have identical structures and weights that are shared among the user descriptors and the item descriptors by identifying user descriptors and item descriptors with same dimensionality. This allows the training module 320 to reduce training time and computational power since a fewer number of models and parameter values are determined. For example, a set of user descriptors including the user preference vector $\Phi_R^U(u)$ of equation (2A), and a set of item descriptors including the item preference vector $\Phi_R^V(v)$ of equation (3A) can be input into the shared neural network model to generate the latent user vector and the latent item vector, as both preference vectors have a dimensionality of n.

In another embodiment, the latent user vector $U(u,:)^T$ is generated by applying a corresponding neural network model to each user descriptor and combining the outputs with a unified network model to generate the latent user vector, and the latent item vector is generated by applying a corresponding neural network model to each item descriptor and combining the outputs with a unified network model to generate the latent item vector.

In other words, the latent user vector can be represented as:

$$U(u,:) = f_U(f_U^R(\Phi_R^U; \theta_R^U), f_U^C(\{\Phi_i^U\}_i; \theta_C^U), f_U^{VU}(\{\Phi_i^{VU}\}; \theta_{VU}^U); \theta_U) \qquad (12)$$

where $f_U^R(\cdot)$ denotes the user preference network applied to the user preference vector, $f_U^C(\cdot)$ denotes the user content network applied to user content vectors, $f_U^{VU}(\cdot)$ denotes the rated item network applied to rated item vectors, and $f_U(\cdot)$ denotes the unified user network that combines the output of each network model to generate the latent user vector. Similarly, the latent item vector can be represented as:

$$V(v,:) = f_V(f_V^R(\Phi_R^V; \theta_R^V), f_V^C(\{\Phi_i^V\}_i; \theta_C^V), f_V^{UV}(\{\Phi_i^{UV}\}; \theta_{UV}^V); \theta_V) \qquad (13)$$

where $f_V^R(\cdot)$ denotes the item preference network applied to the item preference vector, $f_V^C(\cdot)$ denotes the item content network applied to item content vectors, $f_V^{UV}(\cdot)$ denotes the rating user network applied to rating user vectors, and $f_V(\cdot)$ denotes the unified item network that combines the output of each neural network model to generate the latent item vector.

Figure 6:
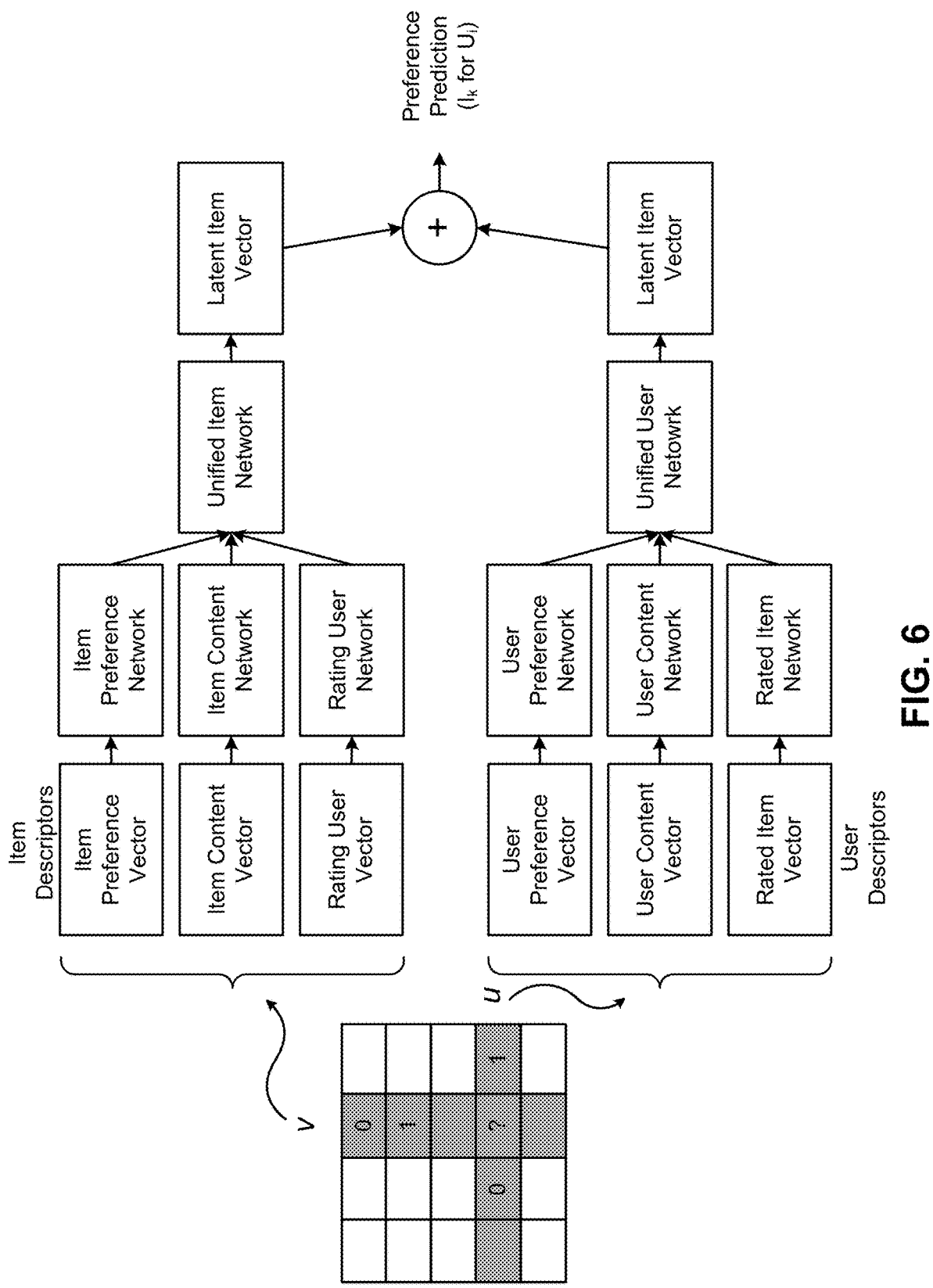
FIG. 6 shows an example predictive model, in accordance with another embodiment.

FIG. 6 shows an example predictive model, in accordance with another embodiment. As shown in FIG. 6, the latent item vector is generated by identifying the item descriptors from item v, and transforming each of the item descriptors with a corresponding neural network model. The outputs are combined with a unified item network to generate the latent item vector. Similarly, the latent user vector is generated by identifying the user descriptors from user u, and transforming each of the user descriptors with a corresponding neural network model. The outputs are combined with a unified user network to generate the latent user vector.

Similarly to the implementation described in reference to FIG. 5, one or more of the user descriptor networks can be shared with one or more of the item descriptor networks by identifying user descriptors and item descriptors with same dimensionality. For example, the user preference network and item preference network can be shared and applied to the user preference vector $\Phi_R^U(u)$ of equation (2A) and the item preference vector $\Phi_R^V(v)$ of equation (3A). As another example, the user content network and the rating user network can be shared and applied to the set of user content vectors $\{\Phi_i^U(u)\}_{i=1, 2, \ldots, K_U}$ and the set of rating user vectors $\{\Phi_i^{UV}(v)\}_{i=1, 2, \ldots, K_U}$. As another example, the item content network and the rated item network can be shared and applied to the set of item content vectors $\{\Phi_i^V(v)\}_{i=1, 2, \ldots, K_V}$ and the set of rated item vectors $\{\Phi_i^{VU}(u)\}_{i=1, 2, \ldots, K_V}$. As another example, the unified user network and the unified item network can be shared and applied to the outputs of each descriptor network.

Returning to FIG. 2, the prediction module 235 generates rating predictions for users and items in the rating matrix database 260, and provides recommendations to users of client devices 116. Specifically, the predicted rating for a user u and an item v may be generated by applying the predictive model to the user and item. For example, when the predictive model is a machine-learned model, the predicted rating is generated by identifying the set of user and item descriptors for the user and item, and applying the machine-learned model to the identified descriptors to generate the latent vectors for a rating prediction.

When values for one or more user and item descriptors are unknown, the prediction module 235 can generate rating predictions by setting the descriptor vectors to a zero vector. For example, when predictions are made for a new user that does not have preference information, the prediction module 235 sets the values for the user preference vectors and the rated item vectors to zero vectors, and generates the latent user vector for the user using only the identified user content vectors. As another example, when predictions are made for a new user that does not have user content information, the prediction module 235 sets the values for the user content vector to zero vectors. Similarly, when predictions are made for a new item that does not have preference information, the prediction module 235 sets the values for the item preference vectors and the rating user vectors to zero vectors, and generates the latent item vector using only the identified item content vectors, and when predictions are made for a new item that does not have item content information, the prediction module 235 sets the values for the item content vectors as zero vectors.

Thus, the prediction module 235 can determine predictions in real-time for new users or items by identifying relevant descriptors for the new users or items, and applying a forward-pass through the neural network models to generate the latent user vector and latent item vectors without the need for re-training the models. Moreover, the prediction module 235 can continuously update predictions as existing users and items interact with the online system 110 by re-generating the user and item descriptors for the users and items and applying the predictive models to the updated descriptors.

The prediction module 235 may provide users of the online system 110 with recommended items identified based on the rating predictions. For example, the prediction module 235 may identify a list of items having a predicted rating above a predetermined threshold for a particular user u, and provide the list of items to the user's client device 116 for recommendation. As another example, the prediction module 235 may identify a threshold proportion of items that have the highest predicted ratings in the set of items for the online system 110, and provide the list of items to the user u for recommendation.

FIG. 7 illustrates performance results of example predictive models presented herein to that of other models. Specifically, the results shown in FIG. 7 train predictive models as discussed herein and other models on a training data that is a subset of of the "CiteULike" dataset. The "CiteULike" data set contained information on which articles users saved in their libraries. There were data 5,551 users, 16,980 articles, and 204,986 observed user-article pairs. Thus, the ratings in the rating matrix database was a binary value in which "1" indicated that the corresponding user saved the corresponding article in his/her library, and "0" indicated that he/she did not. The data also contained article content information in the form of title and the abstract of each article that can potentially be incorporated in item content vectors and rated item vectors.

The performance of each model is determined by applying the models on test data that is a subset of the same dataset that does not overlap with the training data, and comparing the proportion of data instances in the test data in which the estimated rating is similar or equal to the actual rating of the data instance. One metric that measures the performance of the models in a binary setting such as the CiteULike data is the recall:

$$\text{Recall} = P(S(u, v) = 1 \mid R(u, v)) = \frac{\sum_{u,v \in T} \mathbb{1}(R(u, v) = 1, S(u, v) = 1)}{\sum_{u,v \in T} \mathbb{1}(R(u, v) = 1)}$$

that indicates the ratio of the number of binary ratings that were correctly predicted by a model to be relevant to the number of ratings that were relevant. The estimated rating $S(u,v)$ is determined to have a value equal to 1 if the output of the preference prediction is above a predetermined threshold. Results indicated that the predictive models presented herein significantly outperformed the other models for rating prediction.

FIG. 7 shows the recall within the top 200 instances that have the highest preference prediction values. The model "LDA" is the Latent Dirichlet Allocation model, "WMF" is the matrix factorization for binary data approach, "CTR" combines WMF with LDA, and "SVD" is the truncated SVD approach for collaborative filtering. The CTR model uses the WMF representation when preference information is available for item v, and users the LDA representation when preference information is not available for the item v. The predictive model "DNN-R" is the model shown in equation (12), using the user preference vector of equation (2A) and the item preference vector of equation (3A). "DNN-SVD" is the predictive model shown in equation (12), using the user preference vector of equation (2B) and the item preference vector of equation (3B). "DNN-CONT" is the model shown in equation (12), using the user preference vector of equation (2B) and the item preference vector of equation (3B), and also incorporating the article title and abstract information into an item content matrix and a rated item matrix with a dimensionality of 16,980×8,000.

The recall of LDA was approximately 0.7, the recall of WMF was approximately 0.82, the recall of CTR was approximately 0.86, the recall of SVD was approximately 0.77, the recall of DNN-R was 0.85, the recall of DNN-SVD was approximately 0.85, and the recall of DNN-CONT was approximately 0.87. The results indicated that although DNN-R and DNN-SVD do not use any content information, the recall was significantly higher than WMF that also does not use content information. DNN-R and DNN-SVD also perform on par with each other, indicating that although the truncated SVD reduces preference vector dimensionality, which also reduces computational requirements by about 10% without reducing accuracy. In addition, DNN-CONT has comparable performance to CTR, and can successfully incorporate both preference and content information in one model. Moreover, in contrast to CTR, which can only handle content in the form of LDA compatible vectors, the predictive model presented herein can handle any form of content information.

Figure 8A:
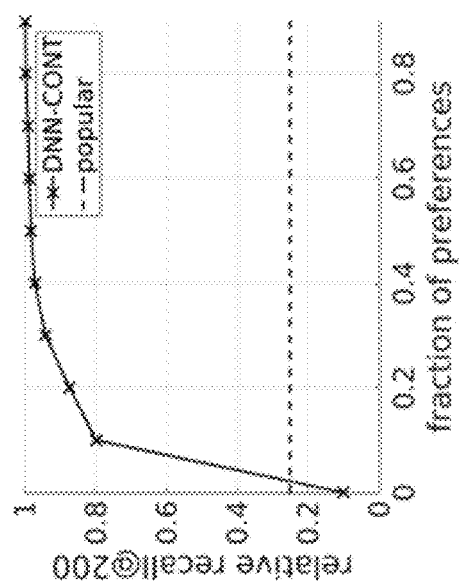
FIG. 8A shows performance results of example predictive models to incorporate new preference information for new items.

FIG. 8A shows performance results of example predictive models to incorporate new preference information for new items. The recall shown in FIG. 8A was calculated by using an increasing larger fraction of preference information for 500 users in the CiteULike data set. The values show the recall relative to a model with all preference information available. As shown in FIG. 8A, only 10% of preference information is required to capture 80% of the performance, and only 30% of the preference information is required to capture >90% of the performance. That is, as additional preference information is entered for an item, as reflected in the fraction of preference information available for that item, the DNN-CONT model quickly improves its predictive ability.

Thus, he results indicate that the DNN-CONT predictive model can effectively incorporate new preference information real-time to generate predictions without re-calibrating or iteratively optimizing the model with the updated rating matrix R.

Figure 8B:
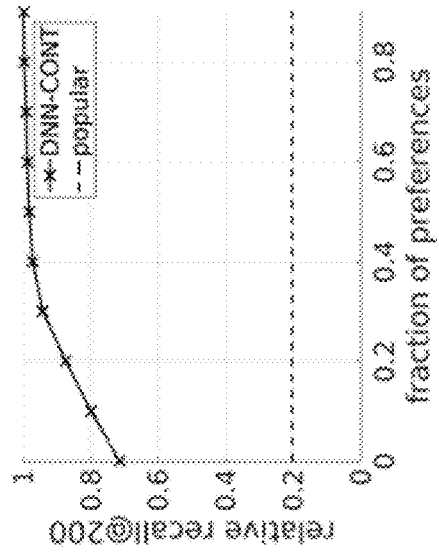
FIG. 8B shows performance results of example predictive models to incorporate new preference information for new users.

FIG. 8B shows performance results of example predictive models to incorporate new preference information for new users. The recall shown in FIG. 8B was calculated by using an increasing larger fraction of preference information for 1000 items in the CiteULike data set. The values show the recall relative to a model with all preference information available. As shown in FIG. 8B, when the fraction of preferences is very small, the DNN-CONT predictive model captures more than 70% of the performance since the DNN-CONT model can incorporate item content information. As additional preference information is incorporated, the model's recall improves such that 30% of preference information is provides >90% of the recall performance.

The results in FIGS. 8A, 8B show that the DNN-CONT predictive model can not only effectively incorporate preference information, but can also incorporate item content information in real-time for new items to generate improved initial predictions even without preference information for the new item.

Figure 9:
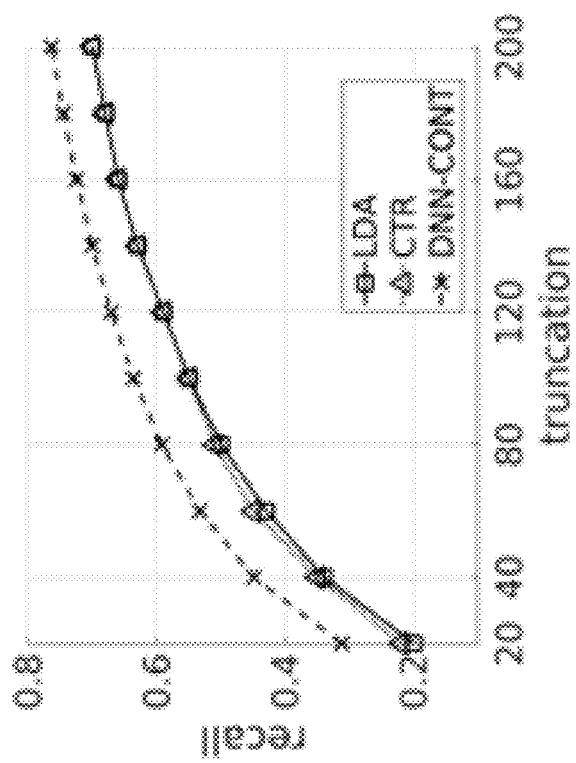
FIG. 9 shows improved performance of example predictive models presented herein compared to other models for predicting ratings for new items.

FIG. 9 shows improved performance of example predictive models presented herein compared to other models for predicting ratings for new items. Thus, the test data was a list of new items that had not been seen by any user u, and in which the item preference vector $\Phi_R^V(v)$ was a zero vector. Specifically, FIG. 9 shows incremental recall for the models LDA, CTR, and DNN-CONT calculated with increasing subsets of test data instances that have the highest preference prediction values for the new items. For example, the data point at truncation 20 indicates the recall value within the 20 test data instances that the highest preference prediction values.

The results indicate that the recall for the predictive model DNN-CONT was almost 0.1 higher at a subset size of 20, and almost 0.06 higher at a subset size of 200 compared to that of the CTR model. This can be attributed to the fact that when the CTR model handles new items, it is only able to user the LDA representations and its accuracy is thus bound by the LDA accuracy. The results show that the DNN-CONT predictive model can be applied to binary recommendations with item content information, and generalizes well to new items.

Figure 10:
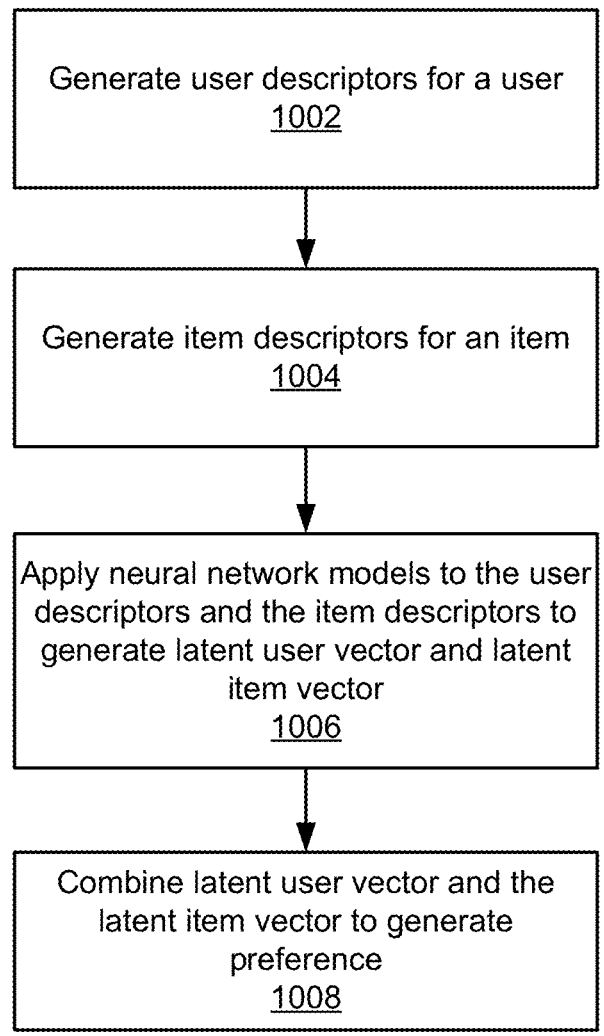
FIG. 10 illustrates a method for predicting a preference of a user and an item, in accordance with an embodiment.

FIG. 10 illustrates a method for predicting a preference of a user in a plurality of users for an item in a plurality of items.

User descriptors are generated 1002 for the user. The user descriptors include at least a user preference vector indicating preferences of the user for other items in the plurality of items. The user descriptors can also include at least a user content vector that indicates a set of identified characteristics for the user. Item descriptors are generated 1004 for the user. Item descriptors can include at least an item preference vector indicating preferences of the item for other users in the plurality of users. Item descriptors can also include at least an item content vector that indicates a set of identified characteristics for the item. One or more neural network models are applied 1006 to the user descriptors and the item descriptors to generate a latent user vector representing the user and a latent item vector representing the item. The latent user vector and the latent item vector are combined 1008 to determine the predicted preference of the user for the item.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for predicting a preference of a user in a plurality of users for an item in a plurality of items, the method comprising:

generating a latent user vector with a first neural network model, the first neural network model trained to receive a plurality of types of user descriptors and output the latent user vector, the plurality of types of user descriptors including a user preference vector indicating preferences of the user for other items in the plurality of items, and a user content vector that indicates a set of identified characteristics for the user, the latent user vector generated by:
   identifying a set of user descriptors for the user corresponding to at least the user preference vector and the user content vector for the user, and
   applying at least the user preference vector and the user content vector for the user to the first neural network model to generate the latent user vector for the user;
generating a latent item vector with a second neural network model, the second neural network model trained to receive a plurality of types of item descriptors and output the latent item vector, the plurality of types of item descriptors including an item preference vector indicating preferences of the item from other users in the plurality of users, and an item content vector that indicates a set of identified characteristics for the item, the latent item vector generated by:
   identifying a set of item descriptors for the item corresponding to at least the item preference vector and the item content vector, and
   applying at least the item preference vector and the item content vector to the second neural network model to generate the latent item vector for the item; and
performing a dot product between the latent user vector and the latent item vector to determine the predicted preference of the user for the item.

2. The method of claim 1, wherein applying the set of user descriptors to the first neural network model further comprises:
   identifying other user descriptors in the plurality of user descriptors not included in the set of user descriptors; and
   setting each of the other user descriptors to a zero vector.

3. The method of claim 1, wherein applying the set of item descriptors to the second neural network model further comprises:
   identifying other item descriptors in the plurality of item descriptors not included in the set of item descriptors; and
   setting each of the other item descriptors to a zero vector.

4. The method of claim 1, wherein the plurality of types of user descriptors further include a rated item vector that describes characteristics of items in the plurality of items for which there is preference information for the user.

5. The method of claim 1, wherein the plurality of types of item descriptors further include a rating user vector that describes characteristics of users in the plurality of users that are associated with preference information for the item.

6. The method of claim 1, wherein the first neural network and the second neural network are identical.

7. The method of claim 1, wherein the user preference vector is a weighted sum of preferences for items that the user has preference information for.

8. The method of claim 1, wherein the latent user vector and the latent item vector are combined through a mathematical function that is not machine-learned.

9. The method of claim 1, further comprising:
   modifying the set of user descriptors for the user;
   applying the modified set of user descriptors to the first neural network model to generate another latent user vector for the user; and
   combining the other latent user vector with the latent item vector to update the predicted preference of the user for the item based on the modified set of user descriptors.

10. The method of claim 9, wherein the set of user descriptors for the user includes a user preference vector, and modifying the set of user descriptors comprises modifying the user preference vector based on a user interaction with another item in the plurality of items.

11. The method of claim 1, further comprising:
   modifying the set of item descriptors for the item; and
   applying the modified set of item descriptors to the second neural network model to generate another latent item vector for the item; and
   combining the other latent item vector with the latent user vector to update the predicted preference of the user for the item based on the modified set of item descriptors.

12. A method for predicting a preference of a user in a plurality of users for an item in a plurality of items, the method comprising:
   generating a latent user vector for the user by applying a set of user descriptors identified for the user to a first neural network model, the set of user descriptors including at least a user preference vector indicating preferences of the user for other items in the plurality of items, and a user content vector indicating a set of identified characteristics for the user;
   generating a latent item vector for the item by applying a set of item descriptors identified for the item to a second neural network model, the set of item descriptors including at least an item preference indicating preferences of the item from other users in the plurality of users, and an item content vector indicating a set of identified characteristics for the item;
   performing a dot product between the latent user vector and the latent item vector according to a non-trained mathematical formula to generate a predicted preference for the user and the item.

13. The method of claim 12, wherein the set of user descriptors includes a user preference vector indicating preferences of the user for other items in the plurality of items, a user content vector that indicates a set of identified characteristics for the user, and a rated item vector that describes characteristics of items in the plurality of items for which there is preference information for the user, or a combination thereof.

14. The method of claim 13, wherein the user preference vector is a weighted sum of preferences for items that the user has preference information for.

15. The method of claim 12, wherein the set of item descriptors includes an item preference vector indicating preferences of the item from other users in the plurality of users, an item content vector that indicates a set of identified characteristics for the item, and a rating user vector that describes characteristics of users in the plurality of users from which there is preference information for the item, or a combination thereof.

16. The method of claim 12, wherein the first neural network model and the second neural network model are jointly trained.

17. The method of claim 16, wherein the joint training of the first neural network model and the second neural network model minimizes error for a preference prediction when the latent item vector and the latent user vector are combined by the untrained function.

18. The method of claim 12, wherein the first neural network model and the second neural network model are identical.

19. The method of claim 12, further comprising:
identifying another set of user descriptors for the user; and
applying the other set of user descriptors to the first neural network model to generate another latent user vector for the user.

20. The method of claim 12, further comprising:
identifying another set of item descriptors for the item; and
applying the other set of item descriptors to the second neural network model to generate another latent item vector for the item.

21. A non-transitory computer-readable medium containing instructions for execution on the processor, the instructions comprising:
generating a latent user vector with a first neural network model, the first neural network model trained to receive a plurality of types of user descriptors and output the latent user vector, the plurality of types of user descriptors including a user preference vector indicating preferences of the user for other items in the plurality of items, and a user content vector that indicates a set of identified characteristics for the user, the latent user vector generated by:
identifying a set of user descriptors for the user corresponding to at least the user preference vector and the user content vector for the user, and
applying at least the user preference vector and the user content vector for the user to the first neural network model to generate the latent user vector for the user;
generating a latent item vector with a second neural network model, the second neural network model trained to receive a plurality of types of item descriptors and output the latent item vector, the plurality of types of item descriptors including an item preference vector indicating preferences of the item from other users in the plurality of users, and an item content vector that indicates a set of identified characteristics for the item, the latent item vector generated by:
identifying a set of item descriptors for the item corresponding to at least the item preference vector and the item content vector, and
applying at least the item preference vector and the item content vector to the second neural network model to generate the latent item vector for the item; and
performing a dot product between the latent user vector and the latent item vector to determine the predicted preference of the user for the item.

22. The non-transitory computer-readable medium of claim 21, wherein applying the set of user descriptors to the first neural network model further comprises:
identifying other user descriptors in the plurality of user descriptors not included in the set of user descriptors; and
setting each of the other user descriptors to a zero vector.

23. The computer-readable medium of claim 21, wherein applying the set of item descriptors to the second neural network model further comprises:
identifying other item descriptors in the plurality of item descriptors not included in the set of item descriptors; and
setting each of the other item descriptors to a zero vector.

24. The non-transitory computer-readable medium of claim 21, wherein the plurality of types of user descriptors further include a rated item vector that describes characteristics of items in the plurality of items for which there is preference information for the user.

25. The non-transitory computer-readable medium of claim 21, wherein the plurality of types of item descriptors further include a rating user vector that describes characteristics of users in the plurality of users that are associated with preference information for the item.

26. The non-transitory computer-readable medium of claim 21, wherein the first neural network and the second neural network are identical.

27. The non-transitory computer-readable medium of claim 21, wherein the user preference vector is a weighted sum of preferences for items that the user has preference information for.

28. The non-transitory computer-readable medium of claim 21, wherein the latent user vector and the latent item vector are combined through a mathematical function that is not machine-learned.

29. The non-transitory computer-readable medium of claim 21, further comprising:
identifying another set of user descriptors for the user; and
applying the other set of user descriptors to the first neural network model to generate another latent user vector for the user.

30. The non-transitory computer-readable medium of claim 21, further comprising:
identifying another set of item descriptors for the item; and
applying the other set of item descriptors to the second neural network model to generate another latent item vector for the item.

31. A system comprising:
a processor configured to execute instructions;
a computer-readable medium containing instructions for execution on the processor, the instructions causing the processor to perform steps of:
generating a latent user vector with a first neural network model, the first neural network model trained to receive a plurality of types of user descriptors and output the latent user vector, the plurality of types of user descriptors including a user preference vector indicating preferences of the user for other items in the plurality of items, and a user content vector that indicates a set of identified characteristics for the user, the latent user vector generated by:
identifying a set of user descriptors for the user corresponding to at least the user preference vector and the user content vector for the user, and
applying at least the user preference vector and the user content vector for the user to the first neural network model to generate the latent user vector for the user;
generating a latent item vector with a second neural network model, the second neural network model trained to receive a plurality of types of item descriptors and output the latent item vector, the plurality of types of item descriptors including an item preference vector indicating preferences of the item from other users in the plurality of users, and an item content vector that indicates a set of identified characteristics for the item, the latent item vector generated by:
identifying a set of item descriptors for the item corresponding to at least the item preference vector and the item content vector, and
applying at least the item preference vector and the item content vector to the second neural network model to generate the latent item vector for the item; and performing a dot product between the latent user vector and the latent item vector to determine the predicted preference of the user for the item.

32. The system of claim 31, wherein applying the set of user descriptors to the first neural network model further comprises:
identifying other user descriptors in the plurality of user descriptors not included in the set of user descriptors; and
setting each of the other user descriptors to a zero vector.

33. The system of claim 31, wherein applying the set of item descriptors to the second neural network model further comprises:
identifying other item descriptors in the plurality of item descriptors not included in the set of item descriptors; and
setting each of the other item descriptors to a zero vector.

34. The system of claim 31, wherein the plurality of types of user descriptors further include a rated item vector that describes characteristics of items in the plurality of items for which there is preference information for the user.

35. The system of claim 31, wherein the plurality of types of item descriptors further include a rating user vector that describes characteristics of users in the plurality of users that are associated with preference information for the item.

36. The system of claim 31, wherein the first neural network and the second neural network are identical.

37. The system of claim 31, wherein the user preference vector is a weighted sum of preferences for items that the user has preference information for.

38. The system of claim 31, wherein the latent user vector and the latent item vector are combined through a mathematical function that is not machine-learned.

39. The system of claim 31, further comprising:
identifying another set of user descriptors for the user; and
applying the other set of user descriptors to the first neural network model to generate another latent user vector for the user.

40. The system of claim 31, further comprising:
identifying another set of item descriptors for the item; and
applying the other set of item descriptors to the second neural network model to generate another latent item vector for the item.

* * * * *